United States Patent [19]

Klumb et al.

[11] 4,313,793

[45] Feb. 2, 1982

[54] MACHINE FOR REMOVING IN-CORE INSTRUMENT ASSEMBLIES FROM A NUCLEAR REACTOR

[75] Inventors: Ralph H. Klumb, Simsbury; Kenneth V. Margotta, Rockville; Divakar S. Shendy, Windsor, all of Conn.

[73] Assignee: Combustion Engineering, Inc., Windsor, Conn.

[21] Appl. No.: 87,197

[22] Filed: Oct. 22, 1979

[51] Int. Cl.³ ............................................. G21C 17/00
[52] U.S. Cl. .................................... 376/260; 376/245
[58] Field of Search ............... 176/19 R, 19 J, 19 EC, 176/19 LD, 30, 36 W

[56] References Cited

U.S. PATENT DOCUMENTS

| | | | |
|---|---|---|---|
| 3,145,636 | 8/1964 | Hall et al. | 176/19 R |
| 3,202,580 | 8/1965 | Fortescue et al. | 176/36 W |
| 3,598,996 | 8/1971 | Haebler | 176/19 R |
| 3,751,333 | 8/1973 | Drummond et al. | 176/19 J |
| 3,860,824 | 1/1975 | Stone | 176/19 R |

FOREIGN PATENT DOCUMENTS 1356436 2/1963 France .............................. 176/36 W
932171 7/1963 United Kingdom ............ 176/36 W

*Primary Examiner*—Sal Cangialosi
*Attorney, Agent, or Firm*—L. James Ristas

[57] ABSTRACT

A machine for smoothly and controllably winding or unwinding a stiff in-core-instrument tube onto and off of a reel during ythe refueling of a nuclear reactor. The machine includes a frame (33) and a circular reel (32) having a substantially continuous helical groove (44) extending around the circumference of the reel. The groove is adapted to receive the tube (14). A plurality of cam rollers (52) are carried by the frame and closely spaced around the circumference of the reel. The rollers keep the tube in the groove whereby the tube may be more easily wound onto or off of the reel. In the preferred embodiment, the reel carries a disposable cartridge (46) in which the grooves are formed.

9 Claims, 3 Drawing Figures

MACHINE FOR REMOVING IN-CORE INSTRUMENT ASSEMBLIES FROM A NUCLEAR REACTOR

BACKGROUND OF THE INVENTION

This invention relates to providing apparatus for winding stiff tubing onto and off of a reel in a hostile environment, and in particular, for removing and disposing of in-core instrument assemblies from a nuclear reactor.

The local power density in nuclear reactors is often measured by the use of a plurality of in-core detectors, each of which is contained in an elongated guide tube which guides the detector through a nuclear fuel assembly. Together, the detector and guide tube are typically called in in-core instrument or instrument assembly. The in-core instruments (ICI) are exposed to very high radiation levels and therefore become very highly radioactive. This radioactivity makes the ICI tube and detector extremely dangerous to handle when exhausted detectors are to be disposed of, usually during the reactor refueling outage.

The removal and transfer of exhausted ICI's is performed entirely under a sufficient depth of water to make use of the radiation shielding effect of the water. This requirement, however, often puts the ICI removal activities on the critical path during reactor refueling, especially in reactor installation where the ICI's enter the core through the top of the reactor vessel. Often, the only place in the reactor installation where sufficient water depth exists is directly over the reactor. Thus, the major refueling operations cannot be performed until the ICI replacement operation is completed. During a typical refueling, twenty to thirty ICI's must be individually removed and disposed of.

Prior art ICI removal is performed with the overhead crane, which is intended primarily for moving heavy components and accordingly does not provide fine control of the ICI withdrawal rate. One end of a single ICI is connected to the crane and the ICI is, while dangling from the crane, withdrawn from the reactor and dragged along the refueling pool to a storage or disposal area. This is repeated until all exhausted ICI's have been removed.

From the foregoing description, it can be appreciated that significant savings in refueling time can be achieved if the removal and handling of the ICI can be performed somewhere in the refueling pool other than above the reactor. Furthermore, the use of the overhead crane for ICI removal is not only unwieldy but also prevents the use of the crane for other activities that could be performed in parallel with ICI removal.

SUMMARY OF THE INVENTION

It is therefore an object of the present invention to provide a remotely operable machine for smoothly and controllably removing the ICI from the nuclear reactor and confining the tube in a compact unit which can be easily moved to a disposal area. Furthermore, it is an object of the invention that the ICI may be unwound from the machine with sufficient force to enter into a cutting apparatus and receptacle without the need for an additional driving apparatus.

According to the invention, the machine includes a frame and a circular reel having a substantially continuous helical groove extending around the circumference of the reel. The groove is adapted to receive the ICI tube. Means are provided for driving the reel relative to the frame in both circumferential directions whereby in one direction the ICI tube is wound onto the groove of the reel, and in the other direction the tube is wound off the reel. A plurality of cam rollers are carried by the frame and closely spaced around the circumference of the reel. During the winding operation, the rollers force the tube onto the continuous groove. During the unwinding operation, the rolers provide sufficient friction between the tube and the groove so that the tube may be unwound with enough force to enter the cutting tool or to enter the disposal receptacle. Means are provided to straighten the tube as it unwinds to permit more efficient stacking within a disposal container.

In the preferred embodiment, the grooved portion of the reel consists of a removable cartridge. After the ICI tube has been fully wound onto the grooves of the cartridge, the radioactive portion of the tube can be fed into the cutter and the nonradioactive portion remaining on the cartridge can be disposed of by removing the cartridge from the reel and disposing of the cartridge. A new cartridge is then attached to the reel and the machine is ready for use on another ICI tube.

The present invention can be operated from a deck above the refueling pool while the overhead crane is used for other purposes. This represents a savings of approximately ten hours in a typical refueling operation. Furthermore, in the preferred embodiment, the disposable cartridge permits using the cutter only on the radioactive portion of the ICI tube. Therefore valuable time and the cost of cutting tool replacement parts are greatly reduced because a large portion of the ICI tube can be conveniently disposed of without cutting. Since the receptacle for the cut portions of the ICI will thus contain only radioactive ICI segments, the number of receptacles, and consequently the protective measures associated with their storage, can be significantly reduced.

BRIEF DESCRIPTION OF THE DRAWINGS

These and other benefits and advantages of the invention will be more evident from the accompanying text and drawings in which.

DESCRIPTION OF THE PREFERRED EMBODIMENT

Figure 1:
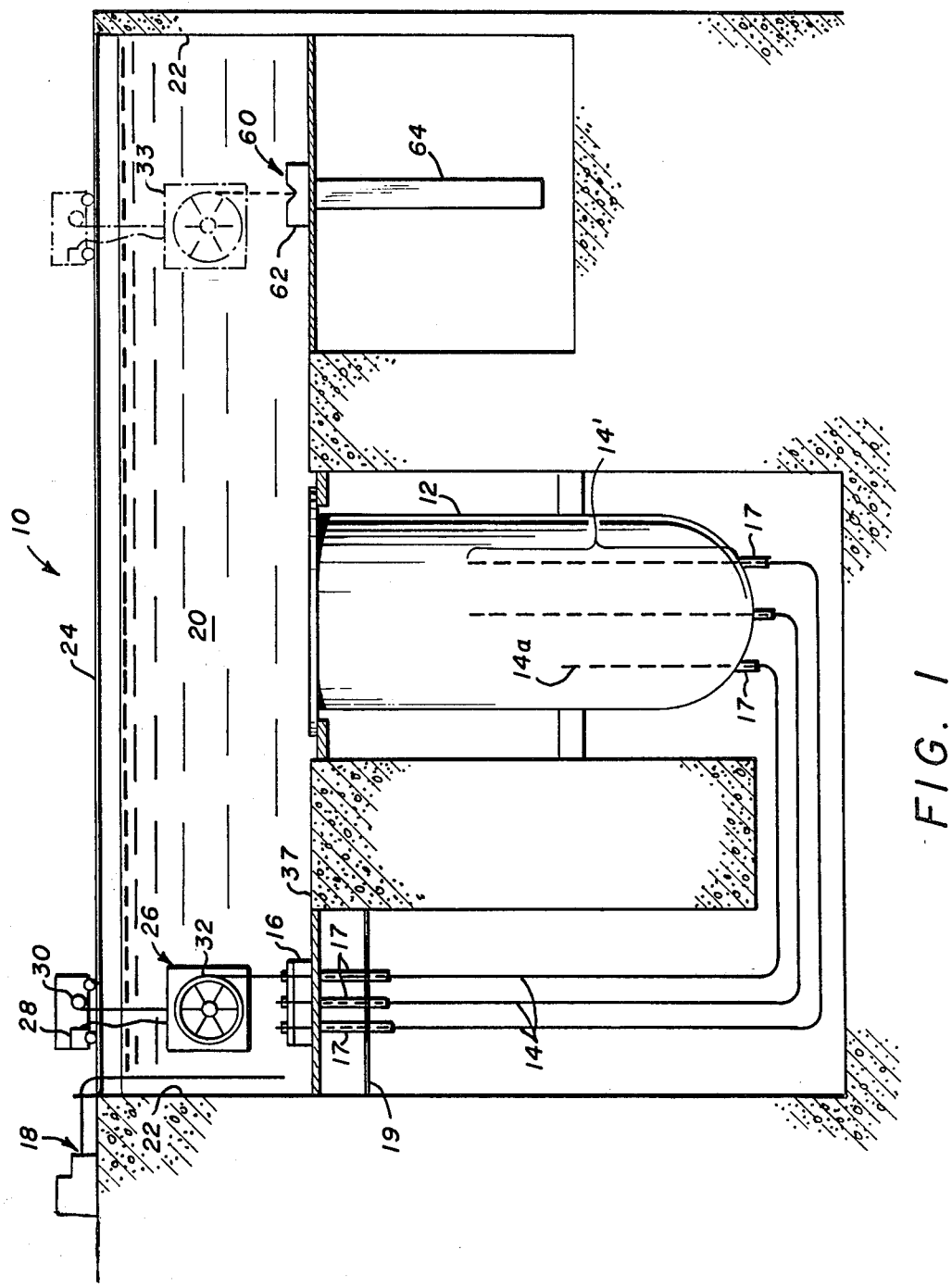
FIG. 1 is an elevation view of a typical nuclear reactor installation showing the ICI guide tubes and the inventive machine in preparation for removing the tubes from the reactor and in an alternate position located over a cutting machine.

FIG. 1 shows a nuclear reactor installation 10 including a nuclear reactor 12 which contains a plurality of nuclear fuel assemblies (not shown). A plurality of in-core instrument guide tubes 14 extend from the seal table 16, through guide pipes 17 permanently mounted in brackets 19, and into the reactor 12. A typical reactor 12 may contain fifty or more individual tubes 14. Each tube 14 contains a detector cable (not shown) which, together with the tube, are referred to as instruments (ICI) or assemblies. Each tube 14 provides a guide into an individual fuel assembly in the reactor 12. The detector cable within each tube is driven by a drive train shown generally at 18. At the seal table 16 the drive train is detachably connected to each guide tube 14 and detector cable contained therein whereby the detector may be moved axially through the reactor 12. It should be appreciated that the ICI guide tubes 14 are typically very stiff, being made of stainless steel and having an outer diameter of approximately 0.5 inches and a thickness of about 0.15 inch. The detector cable itself which moves within the tube 14, is more flexible and, for the purpose of the present invention, does not affect the characteristics of the tube 14. The tube 14 is typically about sixty feet in length.

During each refueling, a fraction of the total number of ICI guide tubes 14 and the detectors contained therein must be removed from service and permanently disposed of. Early in the refueling procedure the refueling pool 20 is filled with water. The pool walls 22 typically support a refueling deck 24 which typically includes tracks for equipment to move in the horizontal plane. The overhead crane (not shown) is located high above the reactor installation 10 and as described above, was previously used to remove and dispose of the ICI tubes 14.

The present invention is shown removing tube 14a from the reactor 12. The machine 26 is vertically located by a pulley system 30 and the winding action for reel 32 is provided by motor 28. The pulley 30 and motor 28 are located for horizontal movement on the track on the deck 24.

It should be understood that other arrangements of ICI reactor penetrations have been used, such as the seal plate 16 being mounted directly above the reactor 12 for penetration through the top thereof. However, the depth of water in the refueling pool 20 is too shallow to permit the radioactive portion 14' of the ICI 14 to be removed from the the reactor and vertically suspended in the pool 20, without violating the radiation limits above the pool 20.

The present invention permits complete removal of the ICI 14 from the reactor 12 and transfer for disposal while keeping all of the ICI sufficiently below the surface of the pool 20 to avoid exceeding radiation limits. In reactor installations where the ICI's are supported within the reactor upper guide structure (UGS) (not shown), the UGS may be removed from the reactor and placed on the fuel pool floor 37, thereby allowing access to the reactor for handling the fuel assemblies. The invention can then be used to remove each ICI from the UGS while fuel assemblies are being shuffled in the reactor.

Figure 2:
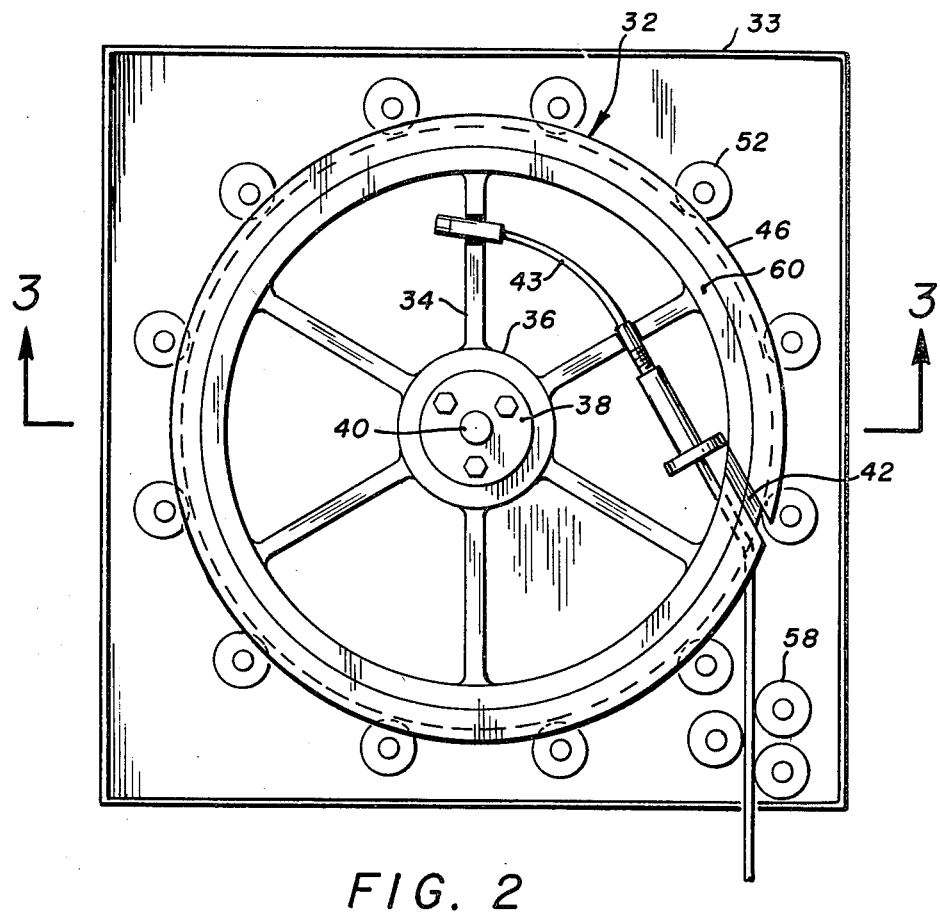
FIG. 2 is a plan view of the invention.
Figure 3:
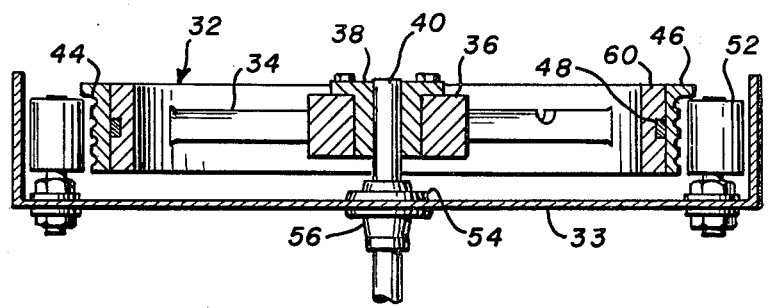
FIG. 3 is a sectional view of the invention along the lines 3—3 of FIG. 2.

Referring now to FIGS. 2 and 3, the reel 32 is carried by a frame 33. In the illustrated embodiment, the reel 32 has a plurality of spokes 34 connected to a hub 36. A split tapered bushing 38 connects the hub 36 to the drive shaft 40, which is operated in a conventional manner by the drive motor 28 (see FIG. 1). A slot 42 is provided in the reel for capturing one end of the ICI tube 14. The detector cable 43 may be secured on a spoke 34. The outer surface of the reel 32 has helical grooves 44 formed in a substantially continuous path around the reel. The groove diameter is preferably equal to the outer diameter of the tube 14. In the illustrated embodiment the end of the ICI tube 14 is manually placed through the slot 42 and located in one of the grooves 44. It is noted that the captured portion of the ICI tube 14 (i.e., the portion closest to the seal table 16 shown in FIG. 1) is not highly radioactive and therefore the leading end can be manually inserted into the slot 42. A variety of means may be provided for capturing the tube 14 on the reel 32. To facilitate capture, the reel may be provided with means, such as the split taper bushing 38, the thrust bearing 54, and radial bearing 56, for selectively permitting the movement of the reel 32 away from the frame 33 and out of alignment with the cam rollers 52. This feature may or may not be necessary depending on the particular means chosen for capturing the tube 14. After the tube 14 is captured in the reel 32, the sixty foot length of stiff tubes 14 is wound onto the reel 32. This can be difficult because of the tendency of the tube to retain its original shape and therefore to come off the reel 32.

According to the present invention, a plurality of cam rollers 52 are connected to the frame 33 and spaced about the reel 32 so that the tube 14 is held closely within the grooved path 44. As the reel 32 is turned counterclockwise in FIG. 2, the tube 14 winds into the groove in a smooth, uninterrupted manner. Since the rollers 52 force the tube 14 to enter the groove 44, there is a unique relationship between the number of revolutions of the reel 32 and the length of tube 14 that has been wound thereon. This may be used to advantage when the length of unwound tube must be known precisely.

The frame 33 is conveniently chosen to be a square about five feet on each side and the reel 32 is approximately four feet in diameter. Twelve rubber or other non-metallic cam rollers 52 having a four inch outer diameter are sufficient to provide the required frictional force on the tube 14. The rollers 52 are mounted on the frame 33 for relatively free rotation but for maintaining a fixed relationship relative to the moving reel 32. The proper distance between the rollers 52 and the grooves 44 is dependent on the diameter of the tube 14, but need not be precisely determined. It has been found, for example, that for the illustrated embodiment the maximum perpendicular distance between the base of the groove 44 and the cam roller 52 should not exceed the nominal outer diameter of the tube 14 by more than 25 percent. To facilitate the feeding and, as will be shoen, the unwinding of the tube 14, a plurality of straightening rollers 58 are provided on the frame 33 for straightening the tube 14 as it moves onto or off of the reel 32.

Referring also to FIG. 1, the alternate position of the machine is shown in phantom. After the tube 14 has been fully wound onto the reel 32, the frame 33 is moved along the track 24 to a cutting station 60 where the tube 14 is unwound from the reel 32 and fed into a cutting device 62. It can be appreciated that, but for the retaining force provided by the cam rollers 52, it would be very difficult to unwind the stiff tube 14 from the reel 32. The rollers 52 prevent the tube 14 from radially coming out of the groove 44 so that the circumferential driving of the reel 32 in the clockwise direction unwinds the tube 14 through the straightening rollers 58 and into the cutting device 62. In one known cutting arrangement, the tube 14 must be fed into a receptable 64 before the cutting operation takes place. As the number of segments in the receptacle increases, however, it becomes exceedingly difficult to feed the next portion of tube 14 into the receptacle. The present invention provides sufficient force to overcome this difficulty without the need for additional feeding equipment.

In the preferred embodiment the reel 32 includes an outer portion 46 in the form of a cartridge detachably connected to the rim portion 60. Such connection is schematically represented at 48. With this embodiment of the invention, the entire ICI 14 is wound onto the reel 32, but only the radioactive portion 14' (see FIG. 1) is unwound into the cutting machine. After the radioactive portion has been cut into segments and placed in the receptacle, the remaining nonradioactive portion (approximately two-thirds of the ICI) is still on the reel. The operator then simply slides the cartridge portion 46, with the tube 14 intact, from the reel 32 and then snaps a cover (not shown) into place over the cartridge. The cartridge with cover thus forms a container that can be safely and conveniently removed from the reactor containment and stored in an area for low level radiation waste.

The preferred embodiment has been described, wherein the ICI consists of a stiff tube containing a flexible detector. It should be understood that the invention also has similar advantages when used with other kinds of ICI, such as the Penflex sheath which is not as stiff as the tube type. The Penflex ICI are more easily coiled so that a smaller reel may be employed on a smaller frame.

It should be appreciated that the present invention not only eliminates the need to use the overhead crane for ICI tube removal and disposal purposes, but also reduces the time, and the radiation exposure to the operators, relative to conventional procedures. The winding operation can be made at a safe depth of water because the ICI tube 14 assumes a compact coil shape and is not strung out and dangled from the crane. The frame 33 may be adapted to include mounts for placement of lead shields around the reel 32 so that the radiation exposure to operating personnel can be further reduced. Since the operation of the inventive machine is under much tighter control than when the overhead crane is used, it will be possible to remove and dispose of the ICI tubes 14 at a faster rate.

We claim:

1. A machine for permanently removing stiff instrument guide tubing from a nuclear reactor, comprising:
   (a) a frame;
   (b) a reel carried on said frame, the reel including a circular cartridge detachably connected to the outer rim of the reel, the cartridge having a substantially continuous helical groove extending around the circumference of the cartridge, the groove having an effective diameter approximately equal to that of the outer diameter of the tube;
   (c) means for capturing one end of the tube on the reel;
   (d) means for selectively driving the reel relative to the frame in either circumferential direction;
   (e) a plurality of cam rollers carried by said frame and closely spaced around the circumference of said reel, said rollers being mounted in fixed relationship to the reel, whereby the cam rollers provide sufficient friction between the groove and the tube so that the tube can be tightly wound onto or wound off from the reel;
   (f) means carried by the frame adjacent to the reel for straightening the tube as it winds onto or off of the reel.

2. The machine recited in claims 1 wherein the means for capturing one end of the tube include wall means in the reel forming a slot through at least one groove.

3. The machine of claim 1 further including means for selective moving said reel out of and into alignment with said cam rollers, whereby access may be had to the means for capturing the tube in said reel.

4. The machine of claim 1 wherein said cam rollers are free to rotate.

5. The machine of claim 1 wherein said cam rollers have an outer surface made of non-metallic material.

6. The machine of claim 1 wherein the perpendicular distance between the base of the groove and the cam roller is no greater than about 25 percent more than the diameter of the tube.

7. The machine of claim 1 wherein a lead shield is carried by the frame and disposed around the reel and cam rollers.

8. The machine recited in claim 1 wherein the means for selectively driving the reel relative to the frame include a hub at the center of the reel and forming an integral part thereof, a drive shaft perpendicularly secured to the hub, and a motor for rotating the drive shaft.

9. The machine of claim 8 further including means for selectively moving said reel out of and into alignment with said cam rollers, including a split taper bushing connecting the hub to the drive shaft, and bearing means between the drive shaft and the frame for permitting selective displacement of the drive shaft in the direction of the shaft axis.

* * * * *

UNITED STATES PATENT AND TRADEMARK OFFICE
CERTIFICATE OF CORRECTION

PATENT NO. : 4,313,793

DATED : Feb. 2, 1982

INVENTOR(S) : Ralph H. Klumb, Kenneth V. Margotta, Divakar S. Shenoy

It is certified that error appears in the above—identified patent and that said Letters Patent is hereby corrected as shown below: On the title page
Inventors: change "Shendy" to --Shenoy--

Abstract: line 3, change "ythe" to --the--

Column 1
Background of the Invention: line 17, change "in" to --an--

Column 4, line 40, change "shoen" to --shown--

*Signed and Sealed this*

*Twenty-fifth* Day of *May 1982*

[SEAL]

Attest:

Attesting Officer

GERALD J. MOSSINGHOFF

Commissioner of Patents and Trademarks